United States Patent
Bugnon et al.

(10) Patent No.: US 7,211,609 B2
(45) Date of Patent: May 1, 2007

(54) WARP-FREE PIGMENT COMPOSITIONS COMPRISING PHTHALOCYANINE PIGMENTS

(75) Inventors: Philippe Bugnon, Le Mouret (CH); Athanassios Tzikas, Pratteln (CH); Hubert Jean Luc Christnacher, Dietwiller (FR); Thomas Healy, Renfrewshire (GB)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/512,794

(22) PCT Filed: Jun. 12, 2003

(86) PCT No.: PCT/EP03/06166

§ 371 (c)(1),
(2), (4) Date: Oct. 26, 2004

(87) PCT Pub. No.: WO04/000949

PCT Pub. Date: Dec. 31, 2003

(65) Prior Publication Data

US 2005/0197432 A1 Sep. 8, 2005

(30) Foreign Application Priority Data

Jun. 19, 2002 (EP) .................................. 02405505

(51) Int. Cl.
C08K 5/34 (2006.01)
C08K 5/3467 (2006.01)
(52) U.S. Cl. ....................................................... 524/88
(58) Field of Classification Search ................... 524/88
See application file for complete search history.

(56) References Cited

U.S. PATENT DOCUMENTS

| 4,189,423 A | 2/1980 | Kumano et al. ............... 260/42 |
| 4,233,206 A | 11/1980 | Katsura et al. ........... 260/42.21 |
| 5,250,111 A * | 10/1993 | Langley et al. .............. 106/411 |
| 5,271,759 A | 12/1993 | Wooden et al. .............. 106/411 |
| 5,274,010 A * | 12/1993 | Bugnon et al. .............. 523/206 |
| 5,830,267 A * | 11/1998 | Zambounis et al. ......... 106/413 |
| 6,123,761 A | 9/2000 | Healy .......................... 106/410 |
| 6,409,956 B1 * | 6/2002 | Flandrin et al. .......... 264/328.1 |

FOREIGN PATENT DOCUMENTS

| EP | 0498667 | 8/1992 |
| EP | 1036824 | 9/2000 |
| JP | 03-12431 | 1/1991 |
| WO | 98/41570 | 9/1998 |

OTHER PUBLICATIONS

P. Bugnon et al., Chimia, vol. 48, No. 9, pp. 436-439.
Chem. Abstr. 1979:73304 for JP 53121845 (1978).
Chem. Abstr. 1983:127147 for JP 57159831 (1982).

* cited by examiner

*Primary Examiner*—Kriellion Sanders
(74) *Attorney, Agent, or Firm*—Joseph C. Suhadolnik

(57) ABSTRACT

The invention provides a composition comprising particles of an optionally halogenated phthalocynine (a); from 0.5 to 10% weight, preferably from 2 to 8% by weight, based on the optionally halogenated phthalocyanine (a), or a vinylic or acrylic polymer (b); and from 1 to 15% by weight, preferably from 3 to 10% by weight, based on the optionally halogenated phthalocyanine (a), of an optionally halogenated phthalocyanine (c) which is outside the particles of the optionally halogenated phthalocyanine (a) and is substituted by a group comprising at least 1 hetero atom selected from the group consisting of N, O, S and P and at least 3 carbon atoms. The instant compositions comprising three essential components are surprisingly warpfree in substrate such as partially crystalline plastics, especially those processed by injection moulding. Geometrically identical parts of different colours are obtained.

16 Claims, No Drawings

WARP-FREE PIGMENT COMPOSITIONS COMPRISING PHTHALOCYANINE PIGMENTS

The invention relates to compositions for the pigmentation of partially crystalline plastics, especially those processed by injection moulding. By using the ternary combination of a phthalocyanine pigment, a derivative thereof having a substituent containing at least one hetero atom and three carbon atoms and a vinylic or acrylic polymer, it is possible to avoid warping to a degree yet out of reach.

In the plastics processing industry, warping following injection moulding is a familiar and severe problem which in the case of partially crystalline plastics is observed in particular in the presence of organic pigments. It is generally assumed that the principal cause of this warping is a nucleation effect induced by the organic pigment particles.

Numerous attempts have already been made, with usually moderate success, to solve this problem, for example by slowing down the injection moulding process, by altering the pigment structure or pigment morphology, by coating the pigment particles, or by means of additives.

Altering the injection moulding parameters is awkward, uneconomic and heavily dependent on the size and geometry of the article being produced. With any change in pigmentation, moreover, laborious adaptation of the parameters is required.

The morphology of the pigment particles can be altered by known methods, for example by milling acicular pigments (including, in particular, phthalocyanines), or by conversion to a different crystal modification or coarser form. The colouristic properties of the pigments, however, are undesirably altered by the change in their morphology.

EP 0 498 667 A2 describes dyes substituted with polyalkyleneoxy groups, which can be used instead of pigments. The improvement in warping, however, is insufficient, and these dyes have unsatisfactory fastness properties. The same applies to the pentyloxy-substituted phthalocyanines known from JP Sho 53/121845 A.

U.S. Pat. No. 4,233,206 describes a method of colouring polyolefin articles using methylol-substituted pigments esterified with long-chain acids. However, the pigment properties suffer, for example the migration. A further factor is that, in combination with normal pigments, these dyes must be either added in high concentrations or else thoroughly, intimately mixed with the pigment. This method, moreover, yields unsatisfactory results in the case of pigments having a particularly high warping tendency, such as phthalocyanines blues and phthalocyanine greens.

U.S. Pat. No. 5,250,111 discloses antiflocculating phthalocyanine compositions comprising acylaminomethyl phthalocyanine derivatives.

Example 15 of GB 2 255 565 A discloses the pigmentation of polyethylene with a pigment composition comprising copper phthalocyanine, sulphonated copper phthalocyanine and a cationic amine-formaldehyde condensate. The dimensional stabilities in length and width are improved, as compared with similar compositions not comprising the sulphonated copper phthalocyanine, but the performance of such compositions does still not entirely satisfy today's increased non-warping requirements, especially in the case of phthalocyanine pigments.

U.S. Pat. No. 6,123,761 discloses a pigment composition comprising octadecylamido copper phthalocyanine, which is used for pigmenting high density polyethylene. The resulting moulding has improved heat stability with respect to its colour, but it is still not entirely satisfactory with respect to warping.

Example 1 of JP Hei 3/12431 A discloses a pigment composition comprising tetrachloro-phthalimidomethyl copper phthalocyanine, which is used for pigmenting polypropylene. The heat resistance is improved, as compared with a similar composition comprising non-halogenated phthalimidomethyl copper phthalocyanine. However, such approach does not resolve the warping problem either.

U.S. Pat. No. 4,189,423 relates to a process for producing dimensionally stable polyolefin mouldings, characterized by the addition of bis-phthalimide compounds. However, the results disclosed for phthalocyanine pigments show that the dimensional stability is still worse than in the absence of organic pigments, even at low pigment and high additive levels. Both blue and green phthalocyanine pigments also still have insufficiently satisfactory shrinkage ratios, in particular in polypropylene.

As described in Chimia 48/9, 436 [1994], one can try to provide pigments with a polymer coating. However, this method does not either permit totally warp-free pigmenting, since in the course of dispersion fracture surfaces, which act as nucleation centres, always form in some of the aggregates.

EP 0 952 183 A1 discloses diketopyrrolo[3,4-c]pyrrole derivatives which enable to get warp-free pigmentations with pigments having

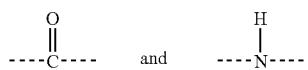

groups. However, common phthalocyanine pigments do not have such groups.

Finally, it is known that reinforcing agents can be added to the partially crystalline plastic, examples being glass fibres or polyamides as disclosed in JP Sho 57/159831 A and WO 98/41570. By virtue of such reinforcing agents, however, the material properties are fundamentally—and for the most part undesirably—altered. Depending on the material to be strengthened, compatibility problems arise, and the materials are no longer recyclable to the desired extent.

The object was therefore to find a process with which partially crystalline plastics can be pigmented in the injection moulding process even with highly warp-promoting phthalocyanine pigments, without a change in their mechanical and chemical properties.

The abovementioned object has been solved in a surprisingly effective way by the use of the instant compositions. The dimensional stability is better by far than when using the pigmentations known to date, and the pigmentary properties of the principal component are essentially retained; in most cases, indeed, warping has completely disappeared. All other properties in the application are excellent, too.

The invention provides a composition comprising
particles of an optionally halogenated phthalocyanine (a);
from 0.5 to 10% by weight, preferably from 2 to 8% by weight, based on the optionally halogenated phthalocyanine (a), of a vinylic or acrylic polymer (b); and
from 1 to 15% by weight, preferably from 3 to 10% by weight, based on the optionally halogenated phthalocyanine (a), of an optionally halogenated phthalocyanine (c) which is outside the particles of the optionally halogenated phthalocyanine (a) and is substituted by a group comprising at least 1 hetero atom selected from the group consisting of N, O, S and P and at least 3 carbon atoms.

The phthalocyanine (a) can be metal-free or metallized with any known metal, such as copper, nickel, cobalt, zinc or another transition metal. Examples of phthalocyanines particularly suitable for the instant warp-free pigmentations are Colour Index Pigment Blue 15, Pigment Blue 15:1, Pigment Blue 15:2, Pigment Blue 15:3, Pigment Blue 15:4, Pigment Blue 15:6, Pigment Blue 16, Pigment Green 7, Pigment Green 36 or Pigment Green 37, as well as the analogues thereof.

Preferably, the phthalocyanine (a) is in the $\alpha$, $\beta$, $\gamma$, $\delta$ or $\epsilon$ crystal phase and is either unsubstituted or substituted by 1 to 16 halogen atoms selected from the group consisting of chlorine and bromine. Most preferred is the $\alpha$ and especially the $\beta$ crystal phase. The phthalocyanine is preferably a pigment having a specific surface of from 15 to 150 m$^2$/g. Particularly preferred, the pigment has a specific surface of at least 18 m$^2$/g, for example of 18 to 50 m$^2$/g for a covering pigment or of 50 to 100 m$^2$/g for a transparent pigment.

The phthalocyanine (a) can be chemically pure or comprise impurities or customary additives in usual amounts within the crystal lattice of its particles, such as derivatives of the phthalocyanine (a), for example as a solid solution. Compounds which form part of the phthalocyanine (a) particles cannot be regarded to be component (c) for the purpose of the invention. On the contrary, the optionally halogenated phthalocyanine (c) which is substituted by a group comprising at least 1 hetero atom selected from the group consisting of N, O, S and P and at least 3 carbon atoms should adequately be present as a separate component, which may partially adsorb onto the particles of the phthalocyanine (a) but without disappearing into them. Suitably, a warp reducing amount of the component (c) should remain unassociated from the phthalocyanine (a) in the composition, for example as separate particles or dissolved into the polymer (b).

Vinylic or acrylic polymers are polymers or copolymers obtainable from one or more vinylic or (meth)acrylic monomers as main components, preferably from monomers at least 50 mol-% of which are selected from the group consisting of vinyl alcohol, vinyl pyrrolidone, vinyl acetate, vinyl chloride, $C_1$–$C_8$acrylates, $C_1$–$C_8$methacrylates, acrylonitrile, acrylic acid and methacrylic acid. Preferred monomers are vinyl alcohol, vinyl pyrrolidone, vinyl acetate $C_1$–$C_8$acrylates and $C_1$–$C_8$methacrylates, most preferred vinyl alcohol, vinyl pyrrolidone and vinyl acetate, in particular polyvinyl alcohol, polyvinyl pyrrolidone and polyvinyl pyrrolidone/vinyl acetate copolymers of molar ratio vinyl pyrrolidone:vinyl acetate 3:7 to 99:1, most preferred poly-vinyl pyrrolidone/vinyl acetate copolymers of molar ratio about 7:3.

Suitable a vinylic or acrylic polymer (b)s have preferably a weight average molecular weight $M_w$ of from 6000 to 200000, most preferred from 10000 to 40000. The polymerisation of unsaturated compounds or mixtures thereof to homopolymers or copolymers of desired $M_w$ and $M_n$ is well-known in the art.

The optionally halogenated phthalocyanine (c) which is outside the particles of the optionally halogenated phthalocyanine (a) and is substituted by a group comprising at least 1 hetero atom selected from the group consisting of N, O, S and P and at least 3 carbon atoms can also be metal-free or metallized with any known metal, such as copper, nickel, cobalt, zinc or another transition metal. Preferably, it comprises at least 50 mol % of a metal-free or metallized component in the $\alpha$ or $\beta$ crystal phase substituted by one group comprising at least 1 hetero atom selected from the group consisting of N, O, S and P and at least 3 carbon atoms, copper phthalocyanines being preferred. In a very particular embodiment, the optionally halogenated phthalocyanine (c) which is substituted by a group comprising at least 1 hetero atom selected from the group consisting of N, O, S and P and at least 3 carbon atoms consists of a single component. The substituting group preferably comprises from 1 to 4 hetero atoms selected from N, O and S, more preferably 2 or 3 hetero atoms, most preferred 2 O and 1 N or 2 O and 1 S.

Examples of a group comprising at least 1 hetero atom selected from the group consisting of N, O, S and P and at least 3 carbon atoms, to which the invention is not restricted in any way, are phthalimidomethyl phthalocyanine, di-$C_2$–$C_{12}$alkylamino phthalocyanine, di-$C_1$–$C_{12}$alkylaminomethyl phthalocyanine, $C_2$–$C_{24}$alkoxymethyl phthalocyanine, $C_3$–$C_{24}$alkoxy phthalocyanine, $C_3$–$C_{24}$alkylthio phthalocyanine, $C_3$–$C_{24}$alkylamino phthalocyanine, $C_3$–$C_{24}$alkylsulfonyl phthalocyanine, $C_3$–$C_{24}$alkylsulfo phthalocyanine, di-$C_2$–$C_{12}$alkylphosphonato phthalocyanine, $C_3$–$C_{24}$alkylaminocarbonyl phthalocyanine, di-$C_2$–$C_{12}$alkylaminocarbonyl phthalocyanine, phthalocyanine $C_3$–$C_{24}$alkyl-sulfonamide or phthalocyanine di-$C_2$–$C_{12}$alkyl-sulfonamide, preferably phthalimidomethyl phthalocyanine, phthalocyanine $C_{12}$–$C_{18}$alkyl-sulfonamide or phthalocyanine di-$C_6$–$C_{12}$alkyl-sulfonamide, most preferred phthalimidomethyl phthalocyanine and non-halogenated or optionally halogenated phthalocyanine n-dodecyl-sulfonamide, phthalocyanine n-octadecyl-sulfonamide, phthalocyanine di-n-octyl-sulfonamide or phthalocyanine di-2-ethyl-hexyl-sulfonamide, in all cases preferably as metal-free and most preferred as copper compounds.

These phthalocyanines are known compounds and can be made by known methods, such as those disclosed for example in the above-mentioned state of the art or also in U.S. Pat. No. 2,761,868, GB 2 184 744 A or EP 1 036 824 A2. Some of them are known as dispersants or crystal growth inhibitors.

All components of the instant composition are preferably non-ionic.

The instant compositions comprising three essential components are surprisingly warp-free in substrates such as partially crystalline plastics, especially those processed by injection moulding, in contrast to similar compositions comprising only two of the instant three components. The nature of this unexpected synergism is not known yet. The results are particularly impressive in polyolefins, in particular in polyethylene, especially in high density polyethylene (HDPE).

Warping is suitably assessed by measuring the actual shrinkage values of coloured and uncoloured rectangular plates after ageing. Preferably, ®Hostalen GC 7260 high density polyethylene (Elenac, Del.) and 0.2% by weight, based on the high density polyethylene, of the instant ternary composition are blended in a glass bottle on a roller for 10 minutes, then extruded in one pass on a single screw extruder at 200° C., then heated to 250° C. and injected into a 174×49×2.5 mm mould maintained at 20° C. through the open 49×2.5 mm surface in a parallel flow. After 15 seconds under pressure in the mould (at which stage the sample temperature is about 30° C.), the pression is released for further 45 seconds; the cold plates are then discharged and kept at 23±3° C. (room temperature) for at least 1 hour, then put into a 90° C. water bath wherein they are maintained for 30 minutes. The samples are then kept at 23±3° C. for 24 hours and their length and width are measured precisely. The length and width shrinkages are determined by substracting the measured values from the corresponding internal dimensions of the mould and dividing by the corresponding internal dimensions of the mould; the obtained values are expressed in %.

Of course, instead of ®Hostalen GC 7260 it is also possible to use other high density polyethylenes, for example ®Stamylan 9089U (DSM, NL). For practical purposes, a producer of injection moulded parts will generally run the test in the substrate which he uses, while keeping in mind that warping depends very much on the substrate's nature and properties. The instant compositions will nevertheless in any case lead to warp-free pigmentations when used in an extruding or preferably in an injection-moulding process, which use is also an object of the invention.

However, the results will generally not differ much from minor changes of the test conditions. For example, it is also possible, instead of the instant composition as such, to use an equivalent amount of a low density polyethylene (LDPE) masterbatch thereof, for example the ten-fold amount of a LDPE masterbatch comprising 2% by weight of the instant composition.

The instant compositions should be considered to be almost warp-free if the following condition is satisfied:

$$\Delta W_{0.296} = \sqrt{\frac{(S_W^S - S_W^P)^2 + (S_L^S - S_L^P)^2}{S_W^{S2} + S_L^{S2}}} \leq 0.20,$$

preferably $\leq 0.12$, most preferred $\leq 0.10$, wherein $S_W^S$ is the width shrinkage of the pure substrate, $S_L^S$ is the length shrinkage of the pure substrate, $S_W^P$ is the width shrinkage of the substrate comprising the instant composition, and $S_L^P$ is the length shrinkage of the substrate comprising the instant composition. The instant compositions can be considered to be entirely warp-free when $\Delta W$ is $\leq 0.08$, preferably $\leq 0.06$, with particular preference $\leq 0.04$ and most preferred $\leq 0.03$.

The ability to obtain warp-free pigmentations with organic pigments is a necessity whenever geometrically substantially identical parts must be obtained, which are either non-coloured or coloured differently, for example but not limited to automotive bodies of cars designed to be quickly interchanged according to fashion and the customer's preferences, for example blue or green.

Hence, the invention also relates to a set of at least a first and a second geometrically substantially identical parts, the first part having a length $L_1$, a width $W_1$ and a height $H_1$ and comprising
particles of an optionally halogenated phthalocyanine (a);
from 0.5 to 10% by weight, preferably from 2 to 8% by weight, based on the optionally halogenated phthalocyanine (a), of a vinylic or acrylic polymer (b); and
from 1 to 15% by weight, preferably from 3 to 10% by weight, based on the optionally halogenated phthalocyanine (a), of an optionally halogenated phthalocyanine (c) which is outside the particles of the optionally halogenated phthalocyanine (a) and is substituted by a group comprising at least 1 hetero atom selected from the group consisting of N, O, S and P and at least 3 carbon atoms,
and the second part having a length $L_2$, a width $W_2$, a height $H_2$ and a colour different from the colour of the first part, wherein the first part and the second part have a maximal difference in size $$\Delta S = \sqrt{\frac{(L_1 - L_2)^2 + (W_1 - W_2)^2 + (H_1 - H_2)^2}{L_1^2 + W_1^2 + H_1^2}} \text{ of } \leq 0.20,$$

preferably $\leq 0,12$, most preferred $\leq 0.10$. For stronger requirements, the maximal difference in size $\Delta S$ is preferably slightly lower, adequately $\leq 0.08$, preferably $\leq 0.06$, with particular preference $\leq 0.04$ and most preferred $\leq 0.03$. The instant parts are any objects, preferably such made from partially crystalline plastics, especially those processed by injection moulding.

Geometrically substantially identical objects are such wherein, when put in imaginary position so that their centers are superposed and their respective length, width and height axes are matching, any point on the outer surface of the first object matches a point on the outer surface of the second object within a distance of $\leq 0$. Differences within the mass of the objects, such as for example voids (gas bubbles), should be disregarded.

Geometrically substantially identical objects are preferably produced in the same mould or in geometrically substantially identical moulds. In contrast to above definition for (moulded) objects, in the case of (metallic) moulds for moulding objects, only the inner surfaces in contact with the desired part of the objects to be moulded should be considered instead of the outer surfaces of the moulded objects.

Objects of different colours are such which, when their reflection spectra are measured under $D_{65}$ light at $10°$ reflection angle, have a colour difference $\Delta E^*$ of at least 10 in the C.I.E. 1976 L*a*b* color space. Objects with a colour difference $\Delta E^*$ as low as 2 may also be considered to be different, if such difference is purposeful and not simply due to lack of process control, reproducibility, or the like. Preferably, different colours of an instant set of parts are characterized by a difference of at least 20 in lightness L*, chroma C* or hue h*.

The instant ternary composition can be prepared by adding its components together in any order and mixing. It is preferred to add also from 0.001 to 100000% by weight of water, based on the weight of the optionally halogenated phthalocyanine (a), and/or to heat to a temperature from 25° C. to 300° C., optionally at a pressure of from 1 to $1 \cdot 10^8$ Pa. Optionally added water is generally removed before the composition is further used to pigment plastics by extruding and/or injection moulding.

This colorant composition may also be mixed with an organic material or have such a material incorporated into it, being present, for example, as a ready-to-use mixture or as a masterbatch. The concentration of the phthalocyanine pigment in the composition of the invention is preferably from 0.001 to 200% by weight, more preferably from 0.01 to 70% by weight and, with particular preference, from 0.02 to 0.5% by weight, based on the weight of the organic material.

The organic material can be a partially crystalline plastic or else, especially in the case of masterbatches, can also comprise other, customary embedding materials, examples being amorphous plastics, such as LLDPE (linear low density polyethylene), waxes, other additives, such as stabilizers, or mixtures thereof. In masterbatches, the concentration of the colorant composition of the invention is preferably from 5 to 200% by weight, based on the embedding material. In a colored article to be used as such without further processing, for example an injection-moulded automotive part, the concentration of the colorant composition of the invention is preferably from 0.02 to 0.5% by weight, based on the overall weight of the article.

By partially crystalline plastics are meant those which solidify to form small crystalline nuclei or aggregates (for example spherulites or quadrites), including those which do so only in the presence of nucleating agents (for example organic pigments).

Partially crystalline plastics are generally thermoplastic organic materials of high molecular mass with a weight average molecular weight ($M_w$) of from $10^4$ to $10^8$, preferably from $10^5$ to $10^7$, and a degree of crystallinity ($X_c$) of from 10 to 99.9%, preferably from 40 to 99% and, with particular preference, from 80% to 99%. Preferred partially crystalline plastics are homopolymers and block or random copolymers and terpolymers of ethylene, propylene, butylene, styrene and/or divinylbenzene, especially α-olefins such as HDPE, LDPE, polypropylene and polystyrene, and also polyesters, such as PET, polyamides, such as nylon 6 and nylon 66.

The partially crystalline plastics may also include additives in conventional amounts, examples being stabilizers, optical brighteners, fillers and/or lubricants, or other non-warping pigments, such as inorganic pigments or the pigment compositions disclosed in EP 0 952 183 A1.

The invention therefore also provides a composition consisting essentially of a partially crystalline plastic and from 0.001 to 200% by weight of a composition of the invention, based on the weight of the partially crystalline plastic.

Compositions comprising an organic material (partially crystalline plastic or else) may be prepared by mixing the formerly disclosed ternary compositions with an organic material or have such a material incorporated into it, being present, for example, as a ready-to-use mixture or as a masterbatch.

Alternatively, it is also suitable to incorporate into the organic material, in any sequence or simultaneously, a binary composition comprising only a phthalocyanine pigment and a vinylic or acrylic polymer, and the optionally halogenated phthalocyanine (c) which is substituted by a group comprising at least 1 hetero atom selected from the group consisting of N, O, S and P and at least 3 carbon atoms.

Any other method of preparation is also suitable, provided that the phthalocyanine pigment particles are superficially treated with a vinylic or acrylic polymer, so that their surface is at least partially recovered by said polymer, before they get into contact with softened or molten partially crystalline plastic.

Hence, the invention also pertains to a method of preparation of an instant composition comprising:

a partially crystalline plastic;
from 0.001 to 200% by weight, based on the weight of the partially crystalline plastic, of an optionally halogenated phthalocyanine (a);
from 0.5 to 10% by weight, preferably from 2 to 8% by weight, based on the optionally halogenated phthalocyanine (a), of a vinylic or acrylic polymer (b); and
from 1 to 15% by weight, preferably from 3 to 10% by weight, based on the optionally halogenated phthalocyanine (a), of an optionally halogenated phthalocyanine (c) which is outside the particles of the optionally halogenated phthalocyanine (a) and is substituted by a group comprising at least 1 hetero atom selected from the group consisting of N, O, S and P and at least 3 carbon atoms, wherein the components of the composition are mixed in such a way that the surface of the optionally halogenated phthalocyanine (a) particles is in contact with the a vinylic or acrylic polymer (b) before it is in contact with partially crystalline plastic having a temperature above its softening point. The softening points $T_g$ of the instant partially crystalline plastics are well-known and can be measured easily by differential scanning calorimetry (DSC).

Any means can be applied to prepare the instant composition. The simpler and quicker the method, the more preferred it is. More sophisticated methods, however, are also an object of the invention. Just as an example, it is possible to add all components to a mixing device, then to mix until the surface of the optionally halogenated phthalocyanine (a) particles is sufficiently coated by the a vinylic or acrylic polymer (b), then optionally to heat to a temperature above the $T_g$ of the partially crystalline plastic, and finally to extrude the resulting composition. If the $T_g$ of the a vinylic or acrylic polymer (b) is above room temperature, it is preferred first to heat to a temperature above process for manufacturing a polymer-based material but below the $T_g$ of the partially crystalline plastic until the coating step is complete. Optionally, some water can be used to accelerate the coating step, which water can easily be removed afterwards by heating above 100° C. and/or by reducing the pressure.

The instant compositions can further be used in any other process for manufacturing a polymer-based material, including for example composites, fibers, elastomers, thickeners, ion-exchange resins and non-crystalline plastics, optionally reinforced or in the form of masterbatches, granulates or dispersions.

The examples which follow elucidate the invention without restricting its scope (percentages are always by weight unless specified otherwise):

EXAMPLE 1

1.2 g Vinyl pyrrolidone/vinyl acetate copolymer (®Luviskol V64, BASF/DE) are dissolved into 400 ml of water. 120 g of an aqueous presscake containing 33.2 weight-% of pure β copper phthalocyanine (C. I. Pigment Blue 15:3) are dispersed therein. The suspension is further agitated for 1 hour, then filtrated. The 5 product is washed with water, then dried at 80° C./1·$10^4$ Pa.

EXAMPLES 2–9

1.4 g of the composition of example 1, a compound of the formula (I)

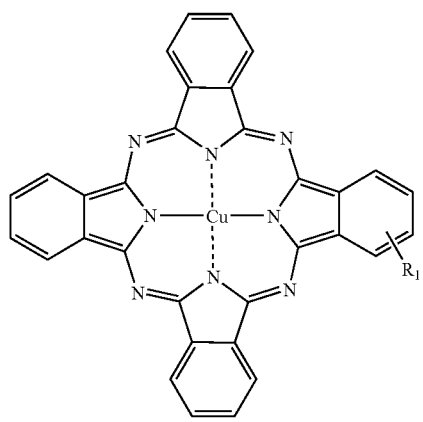

in the amounts specified in the table below, and 700 g of HDPE (®Stamilan 9089U/DSM/NL) are dry-mixed in a tumble mixer for 10 minutes. The mixture is extruded in a single-screw extruder at 200° C. The resultant pellets are processed on an injection moulding machine at 240° C. to give panels measuring 174×49×2.5 mm. Following injection, the panels are kept 1 hour at room temperature (~23° C.) then thermally conditioned in a waterbath at 90° C. for 30 minutes and stored at room temperature for 15 hours. Finally, the panels are measured precisely.

| Example | Amount of (I) | Structure of (I) / $R_1$ = | warp-free |
|---|---|---|---|
| 2 | 0.07 g | ----S(=O)(=O)—NH—(CH$_2$)$_{11}$—CH$_3$ | almost |
| 3 | 0.042 g | ----S(=O)(=O)—NH—(CH$_2$)$_{17}$—CH$_3$ | almost |
| 4 | 0.07 g | ----S(=O)(=O)—N((CH$_2$)$_7$—CH$_3$)$_2$ | almost |
| 5 | 0.07 g | ----CH$_2$—N(phthalimide) | almost |
| 6 | 0.07 g | ----C(=O)—NH—(CH$_2$)$_{11}$—CH$_3$ | almost |
| 7 | 0.07 g | ----C(=O)—NH—(CH$_2$)$_{17}$—CH$_3$ | almost |
| 8 | 0.07 g | ----S—(CH$_2$)$_{11}$—CH$_3$ | almost |
| 9 | 0.07 g | ----CH$_2$—N(CH$_3$)$_2$ | almost |

In all cases the results obtained are almost identical to those with colourless ®Stamilan 9089U. In contrast to the panels obtained with β copper phthalocyanine alone (for example ®Irgalite Blue GBP, Ciba Specialty Chemicals Inc./GB), the panels obtained can be considered to be warp-free.

EXAMPLE 10

The procedure of example 1 is repeated, with the difference that 1.2 g of polyvinylalcohol (®Mowiol 3/83, Hoechst/DE) is used instead of vinyl pyrrolidone/vinyl acetate copolymer.

EXAMPLE 11

The procedure of example 3 is repeated, with the difference that instead of the product of example 1, the same amount of the product of example 10 is used, and the amount of the compound of formula (I) is increased from 0.042 g to 0.07 g:

| Example | Amount of (I) | Structure of (I) / $R_1$ = | warp-free |
|---|---|---|---|
| 11 | 0.07 g | ----S(=O)(=O)—NH—(CH$_2$)$_{17}$—CH$_3$ | entirely |

EXAMPLE 12

The procedure of example 1 is repeated, with the difference that 1.2 g of polyvinylpyrrolidone (K15, $M_r$=~10000, Fluka/CH) is used instead of vinyl pyrrolidone/vinyl acetate copolymer.

EXAMPLE 13

The procedure of example 3 is repeated, with the difference that instead of the product of example 1, the same amount of the product of example 12 is used, and the amount of the compound of formula (I) is increased from 0.042 g to 0.07 g:

| Example | Amount of (I) | Structure of (I) / R₁ = | warp-free |
|---|---|---|---|
| 13 | 0.07 g | ----S(=O)(=O)—N(H)(CH₂)₁₇—CH₃ | entirely |

EXAMPLE 14

0.6 g vinyl pyrrolidone/vinyl acetate copolymer (®Luviskol V64, BASF/DE) are dissolved into 400 ml of water. 490 g of an aqueous presscake containing 49.9 weight-% of chlorinated copper phthalocyanine (chlorine content 48 weight-%, C.I. Pigment Green 7) are dispersed therein. The suspension is further agitated for 1 hour, then filtrated. The product is washed with water, then dried at 80° C./1·10⁴ Pa.

EXAMPLE 15

The procedure of examples 3 is repeated, with the difference that the example 14 is used instead of the product of example 1:

| Example | Amount of (I) | Structure of (I) / R₁ = | ΔW |
|---|---|---|---|
| 15 | 0.042 g | ----S(=O)(=O)—N(H)(CH₂)₁₇—CH₃ | almost |

EXAMPLES 16–17

The procedure of example 15 is repeated, with the difference that the same amount of the compounds (I) of examples 4 and 5 is used instead of the compound (I) of examples 3 and 15:

| Example | Amount of (I) | Structure of (I) / R₁ = | ΔW |
|---|---|---|---|
| 16 | 0.042 g | ----S(=O)(=O)—N((CH₂)₇—CH₃)((CH₂)₇—CH₃) | almost |
| 17 | 0.042 g | ----CH₂—N(phthalimide) | almost |

EXAMPLE 18

It is proceeded like in example 1, with the difference that 2.4 g ®Luviskol V64 are used instead of 1.2 g.

EXAMPLE 19

It is proceeded like in example 1, with the difference that ®Luviskol V73W is used instead of ®Luviskol V64.

EXAMPLE 20

It is proceeded like in example 18, with the difference that ®Luviskol V73W is used instead of ®Luviskol V64.

EXAMPLES 21–44

It is proceeded like in examples 2–9, with the difference that the product according to example 1 is replaced by the products according to examples 18, 19 and 20, respectively.

EXAMPLE 45

Under conditions usual for an aromatic nucleophilic substitution ($S_N2$), C.I. Pigment Green 7 (®Irgalite Blue GFNP, Ciba Specialty Chemicals Inc.) is reacted with 2 molar equivalents of n-dodecylmercaptan. A mixture of isomers and homologues is obtained, corresponding in average approximatively to di-n-dodecylthio trideca-chloro copper phthalocyanine.

EXAMPLE 46

1.4 g of C.I. Pigment Green 7 (®Irgalite Blue GFNP, Ciba Specialty Chemicals Inc.), 0.01 g of vinyl pyrrolidone/vinyl acetate copolymer (®Luviskol V64), 0.07 g of the product according to example 45 and 700 g of HDPE (®Stamilan 9089U/DSM/NL) are dry-mixed in a tumble mixer for 10 minutes. The mixture is extruded in a single-screw extruder at 200° C. The resultant pellets are processed on an injection moulding machine at 240° C. to give panels measuring 174×49×2.5 mm. Following injection, the panels are kept 1 hour at room temperature (~23° C.) then thermally conditioned in a waterbath at 90° C. for 30 minutes and stored at room temperature for 15 hours. Finally, the panels are measured precisely. Results are obtained which match closely those of colourless HDPE.

EXAMPLE 47

(comparative). It is proceeded exactly as in example 46, with the difference that no product according to example 45 is added. There is significant warping, as compared with colourless HDPE.

EXAMPLE 48

Under conditions usual for an aromatic nucleophilic substitution ($S_n2$), C.I. Pigment Green 7 (®Irgalite Blue GFNP, Ciba Specialty Chemicals Inc.) is reacted with 1 molar equivalent of n-dodecylmercaptan. A mixture of isomers and homologues is obtained, corresponding in average approximatively to n-dodecylthio tetradeca-chloro copper phthalocyanine.

EXAMPLE 49

It is proceeded as in example 46, with the difference that 0.042 g of the product of example 48 are used instead of 0.7 g of the product of example 45. The results are similar to those of colourless HDPE.

EXAMPLE 50

(comparative). It is proceeded exactly as in example 49, with the difference that no product of example 48 is added. There is significant warping, as compared with colourless HDPE.

EXAMPLE 51

1.2 g Vinyl pyrrolidone/vinyl acetate copolymer (®Luviskol V73W, BASF/DE) are dissolved into 400 ml of water. 110 g of an aqueous presscake containing 36 weight-% of C.I. Pigment Green 7 (®Irgalite Blue GFNP, Ciba Specialty Chemicals Inc.) are dispersed therein. The suspension is further agitated for 1 hour, then filtrated. The product is washed with water, then dried at 80° C./1·10$^4$ Pa.

EXAMPLE 52

1.4 g of the product according to example 51, 0.07 g of the product according to example 45 and 700 g of HDPE (®Stamilan 9089U/DSM/NL) are dry-mixed in a tumble mixer for 10 minutes. The mixture is extruded in a single-screw extruder at 200° C. The resultant pellets are processed on an injection moulding machine at 240° C. to give panels measuring 174×49×2.5 mm. Following injection, the panels are kept 1 hour at room temperature (~23° C.) then thermally conditioned in a waterbath at 90° C. for 30 minutes and stored at room temperature for 15 hours. Finally, the panels are measured precisely. Results are obtained which match closely those of colourless HDPE.

EXAMPLE 53

(comparative). It is proceeded exactly as in example 52, with the difference that no product according to example 45 is added. There is significant warping, as compared with colourless HDPE.

EXAMPLE 54

It is proceeded as in example 52, with the difference that 0.042 g of of the product of example 48 are used instead of 0.7 g of product according to example 45. The results are similar to those of colourless HDPE.

EXAMPLE 55

(comparative). It is proceeded exactly as in example 52, with the difference that no product according to example 45 is added. There is significant warping, as compared with colourless HDPE.

The invention claimed is:

1. A composition for non-warping pigmentation of semi-crystalline plastics comprising
    particles of an unsubstituted or halogen substituted phthalocyanine (a);
    a vinylic or acrylic polymer (b); and
    from 1 to 15% by weight based on the unsubstituted or halogen substituted phthalocyanine (a), of an optionally halogenated phthalocyanine (c) which is physically outside the particles of the unsubstituted or halogen substituted phthalocyanine (a) and which optionally halogenated phthalocyanine (c) is substituted by a group comprising at least 1 hetero atom selected from N, O, S and P which group also comprises at least 3 carbon atoms,
    wherein said composition comprises in total from 0.5 to 10% by weight vinylic or acrylic polymer based on the unsubstituted or halogen substituted phthalocyanine (a).

2. A composition according to claim 1, wherein the phthalocyanine (a) is metal-free or metallized with copper, nickel, cobalt, zinc or another transition metal.

3. A composition according to claim 1, wherein the vinylic or acrylic polymer (b) is obtainable from monomers at least 50 mol-% of which are selected from the group consisting of vinyl alcohol, vinyl pyrrolidone, vinyl acetate, vinyl chloride, $C_1$–$C_8$ acrylates, $C_1$–$C_8$ methacrylates, acrylonitrile, acrylic acid and methacrylic acid of weight average molecular weight $M_w$ of from 6000 to 200000.

4. A composition according to claim 1, wherein the optionally halogenated phthalocyanine (c) comprises at least 50 mol % of a metal-free or metallized component in the α or β crystal phase substituted by one group comprising at least 1 hetero atom selected from N, O, S and P which group also comprises at least 3 carbon atoms.

5. A composition according to claim 4, wherein the optionally halogenated phthalocyanine (c) consists of a single phthalocyanine component.

6. A composition consisting essentially of a partially crystalline plastic and from 0.001 to 200% by weight of a composition of claim 1, based on the weight of the partially crystalline plastic.

7. A method of preparation of a composition according to claim 6 comprising:
    a partially crystalline plastic;
    from 0.001 to 200% by weight, based on the weight of the partially crystalline plastic, of an unsubstituted or halogen substituted phthalocyanine (a);
    vinylic or acrylic polymer (b); and
    from 1 to 15% by weight based on the unsubstituted or halogen substituted phthalocyanine (a), of an optionally halogenated phthalocyanine (c) which is physically outside the particles of the unsubstituted or halogen substituted phthalocyanine (a) and which optionally halogenated phthalocyanine (c) is substituted by a group comprising at least 1 hetero atom selected from N, O, S and P which group also comprises at least 3 carbon atoms,
    wherein said composition comprises in total from 0.5 to 10% by weight vinylic or acrylic polymer based on the unsubstituted or halogen substituted phthalocyanine (a);
    wherein the components of the composition are mixed in such a way that the surface of the unsubstituted or halogen substituted phthalocyanine (a) particles is in contact with the vinylic or acrylic polymer (b) before it is in contact with partially crystalline plastic having a temperature above its softening point.

8. A process for manufacturing a polymer-based material, wherein a polymer is mixed with a composition according to claim 1.

9. A process for manufacturing a polymer-based material, wherein the polymer-based material is extruded with a composition according to claim 1.

10. A set of at least a first and a second geometrically substantially identical parts, wherein
    the first part is a different color than the second part,
    the first part and the second part have a maximal difference in size $$\Delta S = \sqrt{\frac{(L_1 - L_2)^2 + (W_1 - W_2)^2 + (H_1 - H_2)^2}{L_1^2 + W_1^2 + H_1^2}} \text{ of } \leq 0.20,$$

wherein $L_1$, $W_1$ and $H_1$ are respectively the length, width and height of the first parts,
$L_2$, $W_2$, and $H_2$ are respectively the length, width and height of the second part,
and the first part comprises:
particles of an unsubstituted or halogen substituted phthalocyanine (a);
of a vinylic or acrylic polymer (b); and
from 1 to 15% by weight, based on the unsubstituted or halogen substituted phthalocyanine (a), of an optionally halogenated phthalocyanine (c) which is outside physically the particles of the unsubstituted or halogen substituted phthalocyanine (a) and which optionally halogenated phthalocyanine (c) is substituted by a group comprising at least 1 hetero atom selected from N, O, S and P which group also comprises at least 3 carbon atoms,
and wherein the first part comprises in total from 0.5 to 10% by weight vinylic or acrylic polymer based on the unsubstituted or halogen substituted phthalocyanine (a).

11. A set according to claim 10, wherein the first and second geometrically substantially identical parts are produced in the same mould or in geometrically substantially identical moulds.

12. A composition according to claim 1, wherein the phthalocyanine (a) is selected from the group consisting of Color Index Pigment Blue 15, Pigment Blue 15:1, Pigment Blue 15:2, Pigment Blue 15:3, Pigment Blue 15:4, Pigment blue 15:6, Pigment blue 16, Pigment Green 7, Pigment Green 36 and Pigment Green 37.

13. A process for manufacturing a polymer-based material, wherein the polymer-based material is injection-molded with a composition according to claim 1.

14. A composition according to claim 1, wherein the unsubstituted or halogen substituted phthalocyanine (a) is unsubstituted or substituted 1–16 times by halogens selected from chlorine and bromine.

15. A composition according to claim 1, wherein vinylic or acrylic polymer (b) is present from 2 to 8% by weight based on the unsubstituted or halogen substituted phthalocyanine (a) and optionally halogenated phthalocyanine (c) is present from 3 to 10% by weight based on the unsubstituted or halogen substituted phthalocyanine (a).

16. A composition according to claim 12, wherein the vinylic or acrylic polymer (b) is obtained from monomers at least 50 mol-% of which are selected from the group consisting of vinyl alcohol, vinyl pyrrolidone, vinyl acetate, vinyl chloride, $C_1$–$C_8$ acrylates, $C_1$–$C_8$ methacrylates, acrylonitrile, acrylic acid and methacrylic acid of weight average molecular weight $M_w$ of from 6000 to 200000.

* * * * *